H. SCHNEIDER.
HAY RAKING AND COCKING MACHINE.
APPLICATION FILED MAY 22, 1909.
1,048,595.
Patented Dec. 31, 1912.
4 SHEETS—SHEET 3.
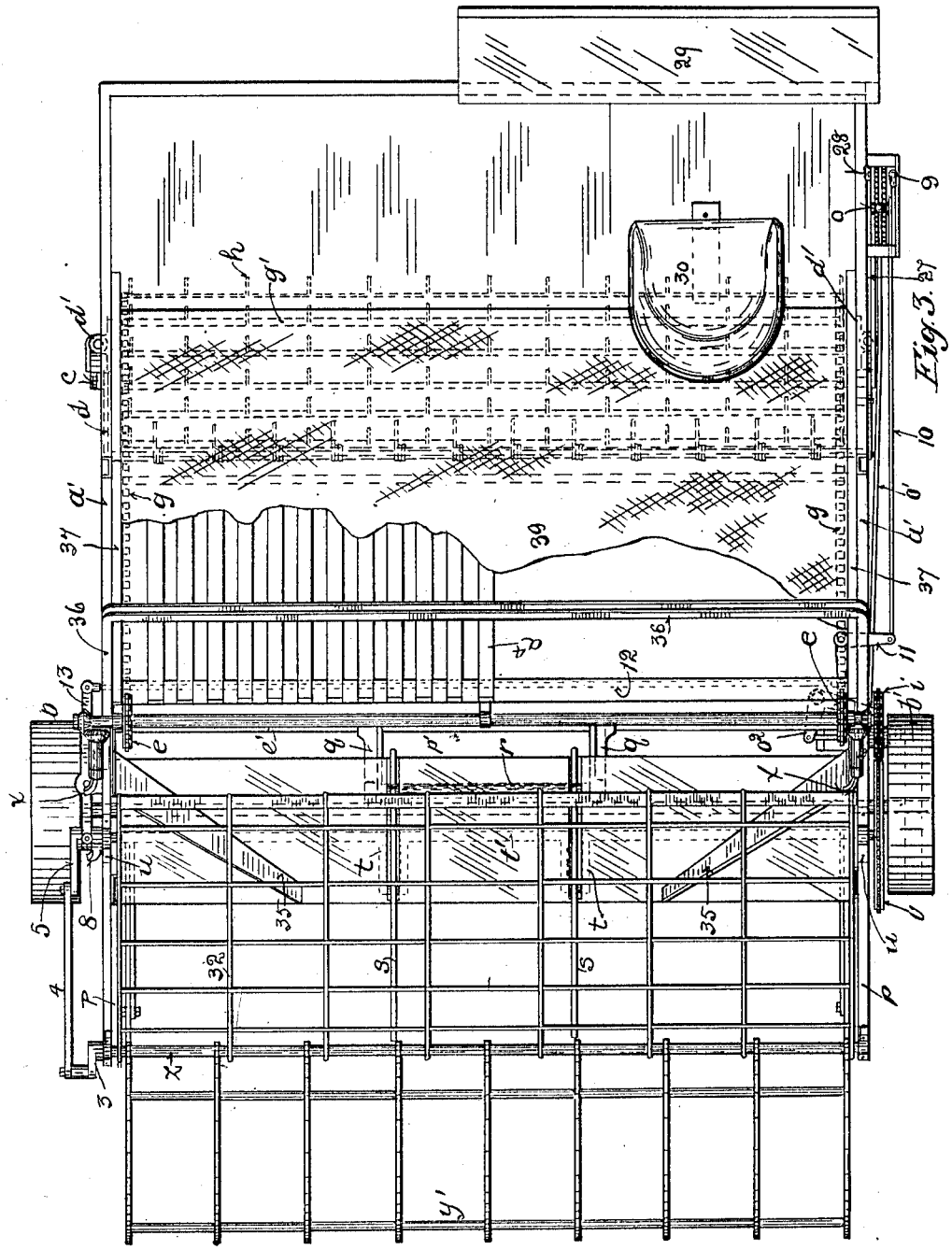
Witnesses:
Inventor:
Henry Schneider
by J. J. Geisler Atty.

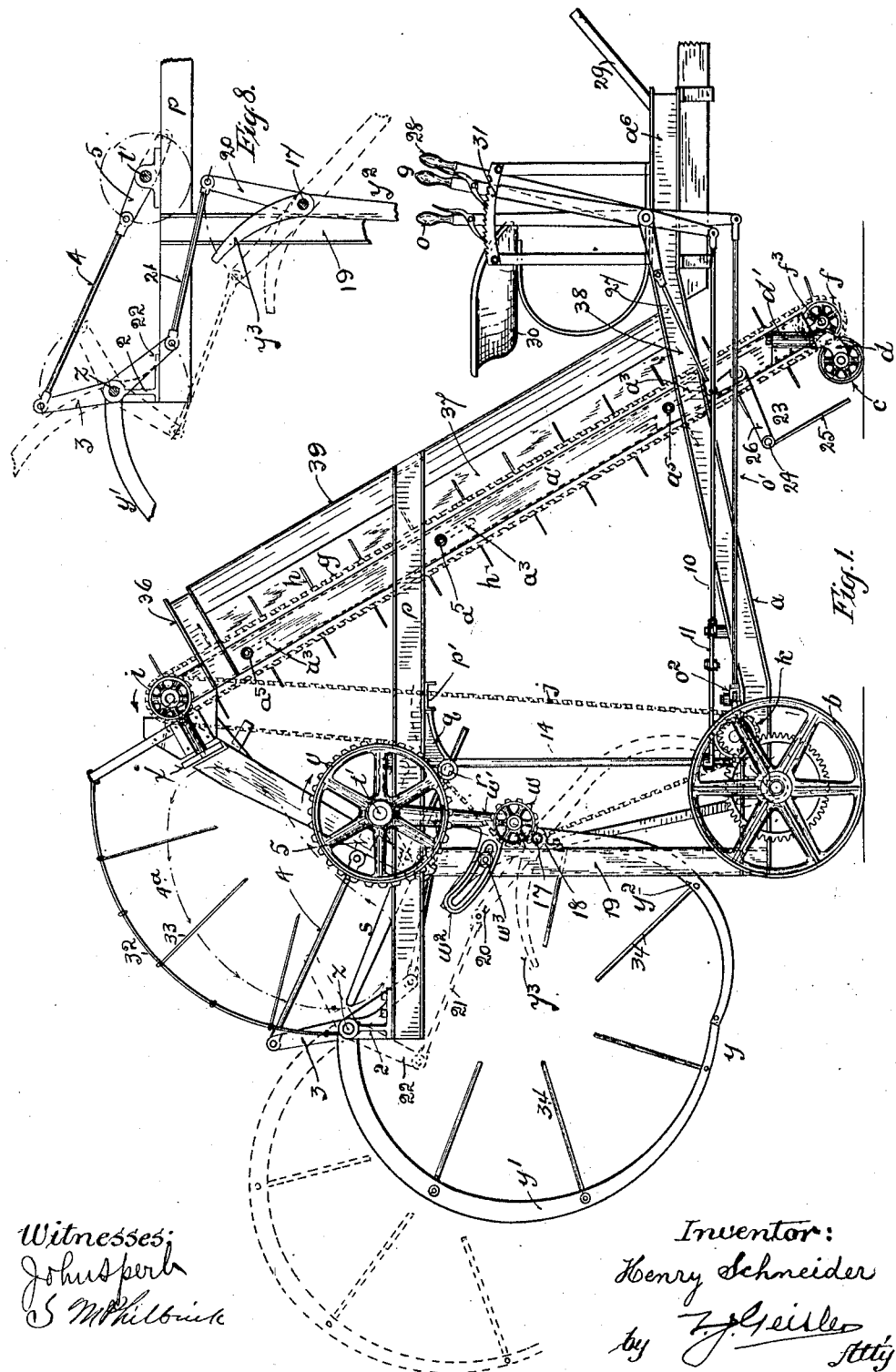

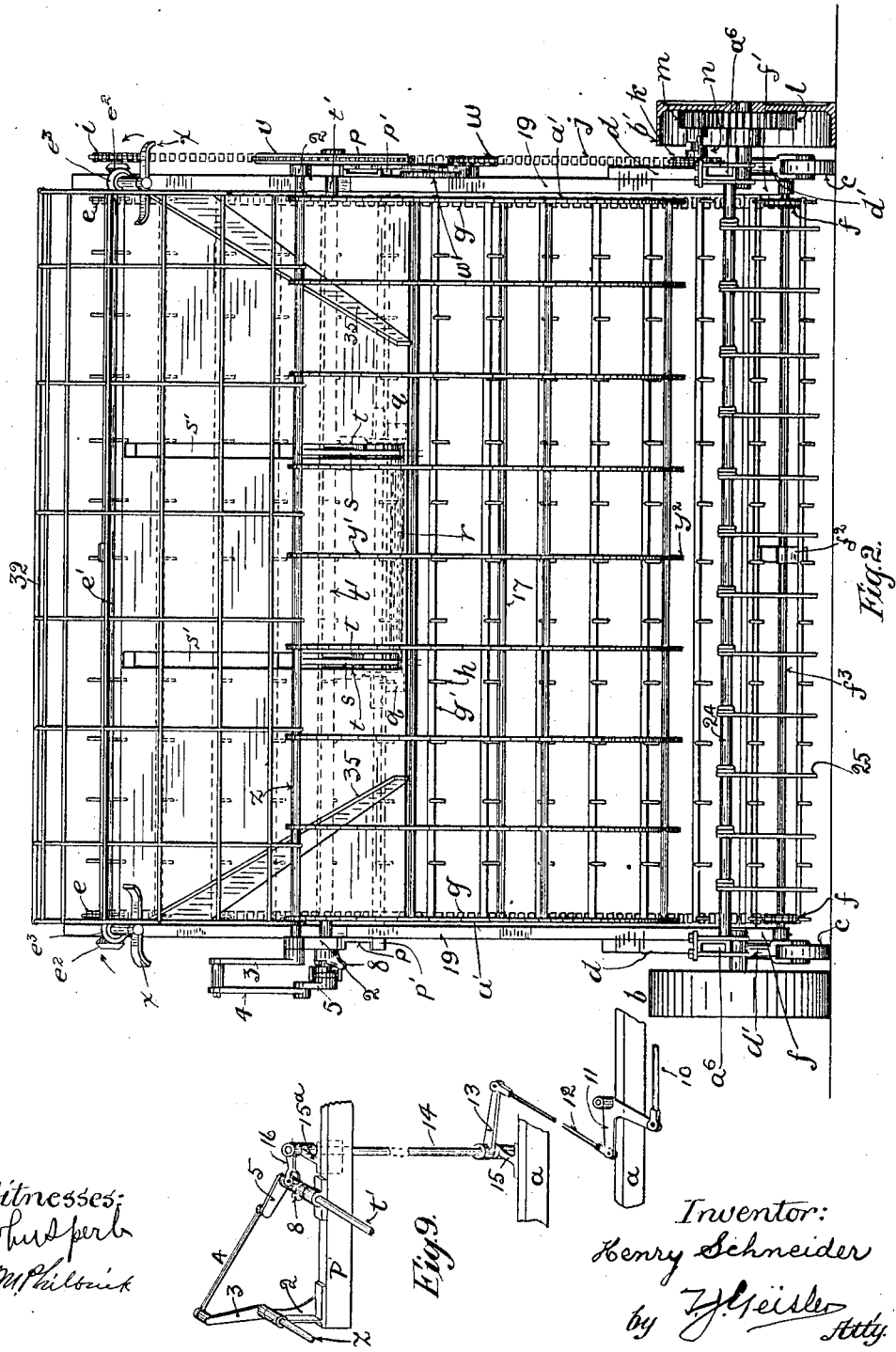

H. SCHNEIDER.
HAY RAKING AND COCKING MACHINE.
APPLICATION FILED MAY 22, 1909.
1,048,595.
Patented Dec. 31, 1912.
4 SHEETS—SHEET 4.
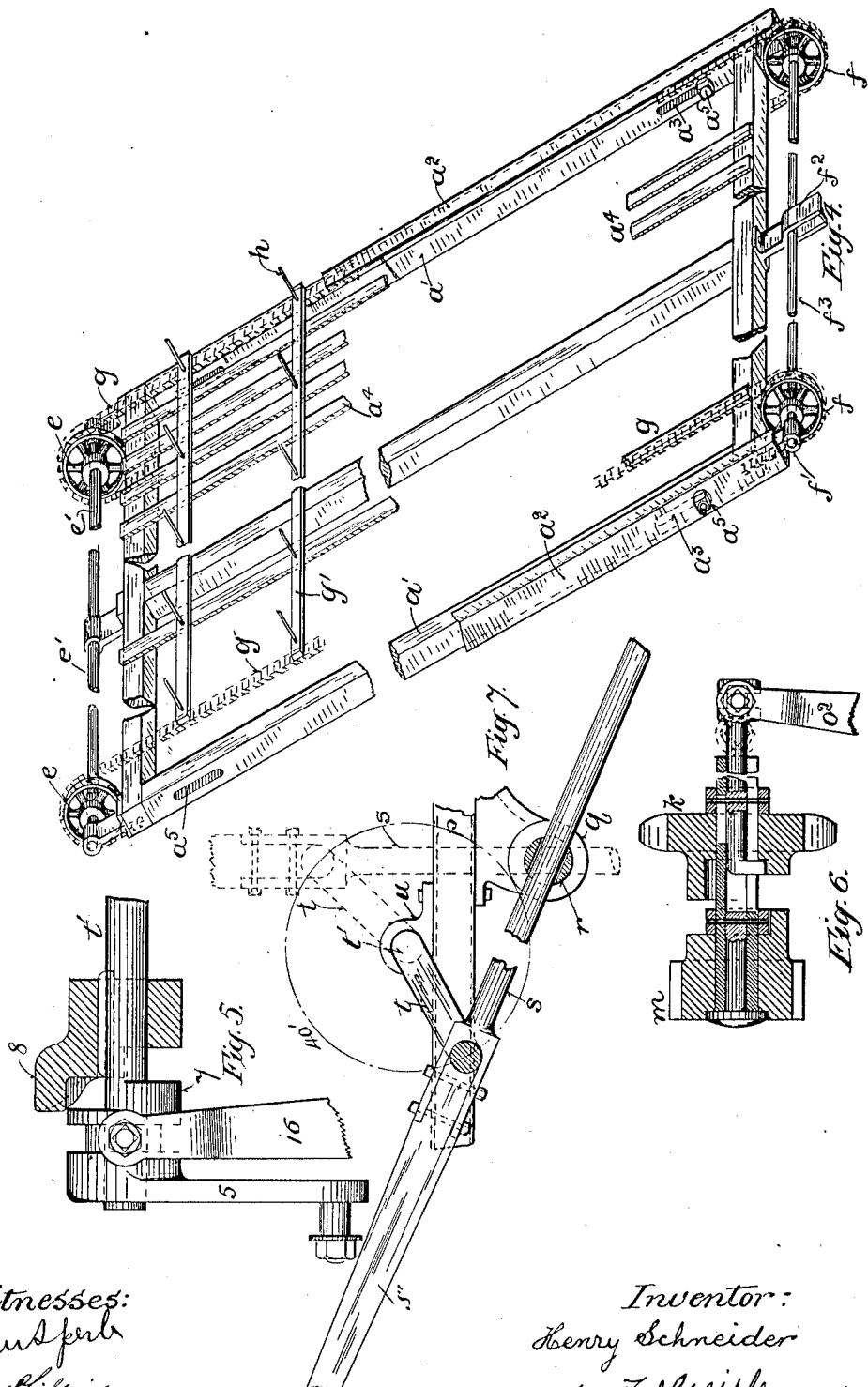
Witnesses:
John S. Ferl
D. N. Philbrick
Inventor:
Henry Schneider
by T. J. Geisler Atty.

UNITED STATES PATENT OFFICE.

HENRY SCHNEIDER, OF PORTLAND, OREGON, ASSIGNOR OF ONE-HALF TO OSCAR WISSINGER, OF MILWAUKEE, OREGON.

HAY RAKING AND COCKING MACHINE.

1,048,595. Specification of Letters Patent. Patented Dec. 31, 1912.

Application filed May 22, 1909. Serial No. 497,809.

*To all whom it may concern:*

Be it known that I, HENRY SCHNEIDER, a citizen of the United States, and a resident of Portland, in the county of Multnomah and State of Oregon, have invented a new and useful Improvement in Hay Raking and Cocking Machines, of which the following is a specification, reference being had to the accompanying drawings as constituting a part thereof.

This invention has for its general object to improve the type of machine in mind so as to cause the same to effectively accomplish the packing of the hay in what I term the bundling basket; also to arrange such basket in two sections or parts adapted to be opened at the bottom, and to combine therewith operating means so arranged that when the basket is opened there will simultaneously be imparted to one section thereof a positive action adapted to discharge the bundle of hay packed in the basket.

To this end my invention comprises the features, devices and combination of parts as hereinafter more specifically set forth.

In the drawings: Figure 1 is a side elevation; Fig. 2 is a rear end elevation; Fig. 3 is a plan or top view; Fig. 4 is a perspective detail of the frame and operating means of the elevator; Figs. 5 and 6 are, respectively, details of the clutch elements constituting a part of the motion-transmitting devices; Fig. 7 is a detail of the mode of operation of the packer arms of my machine; Fig. 8 is a detail of the arrangement and operative connections of my two-part basket; and Fig. 9 is a perspective detail, more or less diagrammatic, of the operating connections between the clutch of the two-part basket devices, and the lever by which the clutch is thrown in and out.

The frame, $a$, is mounted at the rear end on wheels $b$, $b'$, and at the front end on casters $c$, pivoted in pedestals $d$, affixed to the inclined frame-members $a'$, provided with bearings $d'$. On the lower and upper ends of the inclined frame-members $a'$, $a^2$, are provided bearings in which are journaled the ends of the axles $e'$ and $f^3$ of the sprocket-wheels $e$, $e$, and $f$, $f$, of the elevator, which is substantially of the usual construction, comprising sprocket-chains $g$, connected by cross-bars $g'$, provided with fingers $h$.

As shown in Fig. 4, the lower boxes $f'$ of the sprocket-wheels $f$ are fastened to channel-irons $a^2$, adjustably secured, by bolt $a^5$ inserted through slot $a^3$, to the frame-members $a'$, so as to be able to stretch the sprocket-chains taut. The back of the elevator frame is closed by slats $a^4$ to keep hay from falling through. The central bearing $f^2$ of the shaft $f^3$ of the sprocket-wheels $f$ is bifurcated to admit of the adjustment mentioned.

On one end of the upper sprocket-shaft $e'$ is mounted a sprocket-gear $i$, over which runs a chain $j$, the lower end of which runs over a sprocket-gear $k$, seen in Fig. 2.

On the axle of the ground wheels $b'$, within the latter, is provided a gear-wheel $l$, meshing with a pinion $m$, and a clutch element $n$, of common construction, (see detail shown in Fig. 6) is provided to operatively connect the pinion $m$ with the sprocket-wheel $k$, when desiring to throw the elevator, and other moving parts, into action. Such clutch-element $n$ is controlled by a lever $o$, connected therewith by a rod $o'$ and bell-crank $o^2$.

The horizontal frame-members, $p$, are connected by a frame-member, $p'$, made of channel-iron. To the channel-iron $p'$ are affixed pendent brackets $q$, rotatably supporting a shaft $r$; see Fig. 2 and also detail Fig. 7. A crank-shaft $t'$ is journaled in boxes, $u$, secured on the frame-members $p$. The crank-shaft $t'$ has two U-shaped crank-arms $t$, to which are connected the packer arms $s'$, as shown in Fig. 7. Each packer arm $s'$ has a rounded end, $s$, which slides reciprocally in a diametric aperture of the shaft $r$. The shaft $r$ is placed far enough away from the crank-shaft $t'$ so as not to interfere with the turning of the crank-arms $t$. On one end of the crank-shaft $t'$ is mounted a sprocket gear $v$. The rotation of the crank shaft $t'$ causes the crank-arms $t$ to describe a circle 40' (see Fig. 7) and also causes the packer arms $s'$ to follow a path as illustrated by the broken lines 4ª in Fig. 1. The sprocket-chain, $j$, is conducted over the sprocket-gear $v$, by an idler $w$, as shown in Fig. 1. The idler, $w$, is journaled in an arm $w'$ pendent from the crank shaft $t'$, and is provided with a slotted member $w^2$, so that said arm $w'$ may be adjusted by the bolt $w^3$ in position to cause the idler, $w$, to stretch the sprocket-chain $j$, as required.

At the upper end of the sides are provided rotatable beaters $x$, connected by suitable bevel gears $e^2$ and $e^3$ with the shaft $e'$ of the sprocket-wheels $e$, $e$, and $i$, so as to be rotated, as indicated by the arrows, for the purpose of throwing the hay in the interior of my machine, and thus cause the hay to fall in the path of the packer arms $s'$, and finally into the bundle basket $y$. The latter is made of two parts $y'$, $y^2$, arranged as shown in Fig. 1. That is to say, the part $y'$ is suspended at its upper end from a shaft $z$, journaled in boxes 2, supported on the frame-members $p$. The left extremity of the shaft $z$ projects beyond the boxes in which it is journaled and has rigidly affixed thereon an arm 3, connected by a rod 4 with an arm 5, loosely mounted on the extremity of the rotating crank-shaft $t'$, and is adapted to be operatively connected with said crank-shaft $t'$ by a clutch-element including a cam 8, when thrown in contact therewith by operating the lever 9, connected by a rod, 10, with a bell-crank, 11, which is connected by a rod, 12, (see Fig. 3) with an arm 13, rigid on a vertical shaft 14, journaled in boxes 15, 15$^a$ (see Fig. 9) and provided at its upper end with a forked arm 16, connected with the hub of the arm 5. The devices last described, as apparent, constituting a clutch-element, as illustrated in the diagrammatic representation Fig. 9. An enlarged drawing of this is shown in Fig. 5. The clutch member 7 is made to engage the cam 8.

The basket-part $y^2$ is suspended from a shaft 17, journaled in boxes 18, affixed to the frame-members 19. Said part $y^2$ is provided with a rigid arm 20, connected by a rod 21 with an arm 22 rigid to the shaft $z$. The basket-part $y^2$ is provided with inwardly curved fingers $y^3$ at the upper end thereof, and thus, as illustrated in Fig. 8, when the basket-parts $y'$, $y^2$ are swung outward, to open the basket and discharge the bundle of hay therein carried, the finger-ends $y^3$ will swing in and operate to throw the bundle of hay from the basket.

Behind the casters $c$ is pivoted a rake 23, comprising a rod 24, provided with a plurality of wire-fingers 25, said rod 24 being secured at its ends in bell-cranks 26, disposed at the sides of the frame and connected by rods 27 with the lever 28, so that the rake may be lowered and raised from the ground, as desired.

29 is the foot-board, 30 the driver's seat and 31 a quadrant over which the levers $o$, 9, 28 are adjusted.

Parts not specifically described are understood to be of the usual construction.

The arrows 4$^a$, shown in Fig. 1, illustrate the path described by the extremity of the packer arms $s$.

32 is a wire basket provided with end-members 33, preventing the hay from being thrown endwise out of the machine. The basket-parts $y'$, $y^2$ are also made with members 34 to partially close their ends, as shown in Fig. 1.

35 are rigid guide-arms arranged to conduct the hay toward the middle of the basket $y$.

On the upper part of the inclined frame-members $a'$ is bolted a cross frame-member 36, which serves to brace the upper part of the frame of my machine. To the lateral ends of the frame-member 36 are fastened the upper ends of the boards 37, inclosing the sides of the elevator-holding portion of the frame, the lower ends of which boards 37 are fastened to the frame-members $a^6$; and over the boards 37 is stretched a canvas 39 to protect the elevator from the weather; for without such covering of the elevator, in stormy days, the hay raked up by the fingers $h$ of the elevator would be apt to be blown away.

I claim:

1. A hay cocking machine comprising a frame supported on wheels, an elevator, a rake rearward of the elevator, a lever and connections for raising and lowering said rake, a bundle basket arranged to receive the discharge of the elevator, rotating beaters arranged to throw the hay discharged from the elevator at the sides back into the bundle basket, rotating packer arms arranged to describe an elliptical course in a vertical plane and thus pack the hay discharged from the elevator into the bottom of the bundle basket, and gearing driven by the rotation of one of the wheels on which the frame is supported, and connections from the gearing to the operating part, said connections including a clutch element and lever, whereby to throw the connections in and out at will.

2. A hay cocking machine comprising a frame supported on wheels, an elevator, a rake rearward of the elevator, a lever and connections for raising and lowering said rake, a bundle basket arranged to receive the discharge of the elevator, rotating beaters arranged to throw the hay discharged from the elevator at the sides back into the bundle basket, a rock-shaft journaled transversely rearward of the elevator, packer arms slidably supported in said rock-shaft, a crank-shaft journaled parallel to such rock-shaft and having the cranks thereof rotatably connected to said packer arms, and gearing driven by the rotation of one of the wheels on which the frame is supported, and connections from the gearing to the operating parts, said connections including a clutch element and lever, whereby to throw the connections in and out at will.

3. A hay cocking machine comprising a frame supported on wheels, an elevator, a rake rearward of the elevator, a lever and connections for raising and lowering said rake, a bundle basket comprising two parts each pendently hinged on a horizontal axis, and connections causing said parts to operate in unison, the hinge axis of one of said parts being located below the top of such part, so that when said part opens to discharge the load the portion thereof projecting above its hinge axis will move inward and forcibly throw the load out of the basket, rotating beaters arranged to throw the hay discharged from the elevator at the sides back into the bundle basket, rotating packer arms arranged to describe an elliptical course in a vertical plane and thus pack the hay discharged from the elevator into the bottom of the bundle basket, and gearing driven by the rotation of one of the wheels on which the frame is supported, and connections from the gearing to the operating parts, said connections including a clutch element and lever, whereby to throw the connections in and out at will.

4. A hay cocking machine comprising a frame supported on wheels, an elevator, a rake rearward of the elevator, a lever and connections for raising and lowering said rake, a bundle basket comprising two parts each pendently hinged on a horizontal axis, and connections causing said parts to operate in unison, the hinge axis of one of said parts being located below the top of such part, so that when said part opens to discharge the load the portion thereof projecting above its hinge axis will move inward and forcibly throw the load out of the basket, rotating beaters arranged to throw the hay discharged from the elevator at the sides back into the bundle basket, a rock-shaft journaled transversely rearward of the elevator, packer arms slidably supported in said rock-shaft, a crank-shaft journaled parallel to such rock-shaft and having the cranks thereof rotatably connected to said packer arms, and gearing driven by the rotation of one of the wheels on which the frame is supported, and connections from the gearing to the operating parts, said connections including a clutch element and lever, whereby to throw the connections in and out at will.

5. A hay cocking machine comprising a frame supported on wheels, an elevator, a rake rearward of the elevator, a lever and connections for raising and lowering said rake, a cover for the elevator, a bundle basket comprising two parts each pendently hinged on a horizontal axis, and connections causing said parts to operate in unison, the hinge axis of one of said parts being located below the top of such part, so that when said part opens to discharge the load the portion thereof projecting above its hinge axis will move inward and forcibly throw the load out of the basket, rotating beaters arranged to throw the hay discharged from the elevator at the sides back into the bundle basket, a rock-shaft journaled transversely rearward of the elevator, packer arms slidably supported in said rock-shaft, a crank-shaft journaled parallel to such rock-shaft and having the cranks thereof rotatably connected to said packer arms, and gearing driven by the rotation of one of the wheels on which the frame is supported, and connections from the gearing to the operating parts, said connections including a clutch element and lever, whereby to throw the connections in and out at will.

6. In a hay cocking machine, the combination of a frame supported on wheels, an elevator, a rake rearward of the elevator, a lever and connections for raising and lowering said rake, a bundle basket comprising two parts each pendently hinged on a horizontal axis, and connections causing said parts to operate in unison, the hinge axis of one of said parts being located below the top of such part, so that when said part opens to discharge the load the portion thereof projecting above its hinge axis will move inward and forcibly throw the load out of the basket, rotating packer arms arranged to describe an elliptical course in a vertical plane and thus pack the hay discharged from the elevator into the bottom of the bundle basket, and gearing driven by the rotation of one of the wheels on which the frame is supported, and connections from the gearing to the operating parts, said connections including a clutch element and lever, whereby to throw the connections in and out at will.

7. In a hay cocking machine, the combination of a frame supported on wheels, an elevator, a rake rearward of the elevator, a lever and connections for raising and lowering said rake, a bundle basket comprising two parts each pendently hinged on a horizontal axis, and connections causing said parts to operate in unison, the hinge axis of one of said parts being located below the top of such part, so that when said part opens to discharge the load the portion thereof projecting above its hinge axis will move inward and forcibly throw the load out of the basket, a rock-shaft journaled transversely rearward of the elevator, packer arms slidably supported in said rock-shaft, a crank-shaft journaled parallel to such rock-shaft and having the cranks thereof rotatably connected to said packer arms, and gearing driven by the rotation of one of the wheels on which the frame is supported, and connections from the gearing to the operating parts, said connections including a clutch element and lever, whereby to throw the connections in and out at will.

8. A hay cocking machine comprising a frame and running gear including ground wheels supporting the frame, an elevator, a main gear driven by the rotation of one of the ground wheels, a sprocket-wheel on the extremity of the upper axis of the elevator, a sprocket-wheel at the bottom of the frame near the ground wheel, means, including a clutch element, adapted to throw the lower sprocket-wheel in and out of operative engagement with said main gear, a driven crank-shaft transversely journaled between the axis of said lower and upper sprocket-wheels, a sprocket-wheel fast on said driven crank-shaft, a sprocket-chain connecting all of said sprocket-wheels, the latter being vertically alined, an adjustable idler arranged to guide the sprocket-chain to the rim of the sprocket-gear on the driven crank-shaft, a bundle basket comprising two parts hinged on independent horizontal axes, and connections causing said parts to operate in unison, the hinge axis of one of said parts being located below the top of such part, so that when said part opens to discharge the load the portion thereof projecting above its hinge axis will move inward and forcibly throw the load out of the basket, and operative connections, including a clutch element, between said driven crank-shaft and the hinge axis of one of said basket parts.

9. A hay cocking machine comprising a frame and running gear including ground wheels supporting the frame, an elevator, a main gear driven by the rotation of one of the ground wheels, a sprocket-wheel on the extremity of the upper axis of the elevator, a sprocket-wheel at the bottom of the frame near the ground wheel, means, including a clutch element, adapted to throw the lower sprocket-wheel in and out of operative engagement with said main gear, a driven crank-shaft transversely journaled between the axis of said lower and upper sprocket-wheels, a sprocket-wheel fast on said driven crank-shaft, a sprocket-chain connecting all of said sprocket-wheels, the latter being vertically alined, an adjustable idler arranged to guide the sprocket-chain to the rim of the sprocket-gear on the driven crank-shaft, a bundle basket comprising two parts hinged on independent horizontal axes, and connections causing said parts to operate in unison, the hinge axis of one of said parts being located below the top of such part, so that when said part opens to discharge the load the portion thereof projecting above its hinge axis will move inward and forcibly throw the load out of the basket, operative connections, including a clutch element, between said driven crank-shaft and the hinge axis of one of said basket parts, a rock-shaft journaled transversely rearward of the elevator, and packer arms slidably supported in said rock-shaft, said packer arms being connected to the driven crank-shaft so as to be reciprocated thereby.

10. A hay cocking machine comprising a frame and running gear including ground wheels supporting the frame, an elevator, a main gear driven by the rotation of one of the ground wheels, a sprocket-wheel on the extremity of the upper axis of the elevator, a sprocket-wheel at the bottom of the frame near the ground wheel, means, including a clutch element, adapted to throw the lower sprocket-wheel in and out of operative engagement with said main gear, a driven crank-shaft transversely journaled between the axis of said lower and upper sprocket-wheels, a sprocket-wheel fast on said driven crank-shaft, a sprocket-chain connecting all of said sprocket-wheels, the latter being vertically alined, an idler arranged to guide the sprocket-chain to the rim of the sprocket-gear on said driven shaft, said idler being journaled in a pendent swinging arm, means for securing said arm in the position to which adjusted, a bundle basket comprising two parts hinged on independent horizontal axes, and connections causing said parts to operate in unison, the hinge axis of one of said parts being located below the top thereof, so that when said part opens to discharge the load the portion thereof projecting above its hinge axis will move inward and forcibly throw the load out of the basket, operative connections, including a clutch element, between said driven crank-shaft and the hinge axis of one of said basket parts, a rock-shaft journaled transversely rearward of the elevator, and packer arms slidably supported in said rock-shaft, said packer arms being connected to the driven crank-shaft so as to be reciprocated thereby.

HENRY SCHNEIDER.

Witnesses:
CECIL LONG,
JOHN SPERL.

---

Copies of this patent may be obtained for five cents each, by addressing the "Commissioner of Patents, Washington, D. C."